United States Patent [19]

Martin

[11] Patent Number: 4,691,803

[45] Date of Patent: Sep. 8, 1987

[54] PROJECTILE POWERED PISTON

[76] Inventor: Philip N. Martin, P.O. Box 471143, Tulsa, Okla. 74147-1143

[21] Appl. No.: 799,350

[22] Filed: Nov. 18, 1985

[51] Int. Cl.$^4$ .......................... G01V 1/04; F41F 17/06
[52] U.S. Cl. ..................................... 181/113; 181/114; 181/116; 181/119; 181/401; 89/14.4; 89/31; 367/145
[58] Field of Search ................. 181/0.5, 101, 108, 113, 181/114, 116, 118, 119, 120, 142, 400, 401, 402; 367/140, 141, 145; 89/14.4, 31; 102/435, 439, 484, 485

[56] References Cited

U.S. PATENT DOCUMENTS

| | | | |
|---|---|---|---|
| 2,203,140 | 6/1940 | Green | 181/116 |
| 3,275,018 | 9/1966 | Filler | 181/116 |
| 3,363,720 | 1/1968 | Mifsud et al. | 181/114 X |
| 3,511,333 | 5/1970 | Cholet et al. | 181/401 X |
| 3,968,855 | 7/1976 | Mollere | 181/116 X |
| 3,993,974 | 11/1976 | Silverman et al. | 181/119 X |
| 4,223,759 | 9/1980 | Martin | 181/116 |
| 4,316,271 | 2/1982 | Evert | 181/402 X |
| 4,334,591 | 6/1982 | Martin | 181/116 |
| 4,354,572 | 10/1982 | Martin | 181/116 |
| 4,359,131 | 11/1982 | Martin | 181/116 |
| 4,418,786 | 12/1983 | Martin | 181/116 |

Primary Examiner—Deborah L. Kyle
Assistant Examiner—Brian S. Steinberger
Attorney, Agent, or Firm—Head Johnson Stevenson

[57] ABSTRACT

A transportable seismic energy source having a baseplate for contacting the earth, an upper master cylinder affixed at its lower end to the base plate and extending uprightly from it, a receiving cylinder of outside diameter less than the internal diameter of the master cylinder and supported coaxially within the upper portion of the master cylinder, the master cylinder and receiving cylinder being filled with liquid, a slug firing gun mounted to the master cylinder and arranged so that the gun muzzle extends coaxially and above the receiving cylinder. The internal diameter of the receiving cylinder being greater than the maximum diameter of a slug as distorted on impact with the liquid in the cylinders so that when a slug is fired from the muzzle it contacts the liquid in the cylinders and passes it downwardly through the receiving cylinder, the energy of impact of the slug gun muzzle being transmitted to the liquid within the cylinders and from the cylinder baseplate to the earth for propagation in the earth. In a preferred embodiment the internal bore of the master cylinder is provided with serrations which impede the downward flow of fluid to more effectively couple the energy from the fluid to the cylinder and thus to the base plate.

5 Claims, 4 Drawing Figures

PROJECTILE POWERED PISTON

SUMMARY OF THE INVENTION

In seismic exploration and for other purposes it is necessary to introduce seismic energy into the earth's surface. For reference to other devices by which seismic energy may be introduced into the earth's surface utilizing a projectile powered gun see U.S. Pat. Nos. 4,223,299; 4,334,519; 4,359,131; 4,354,572; and 4,418,786.

While a projectile fired from a gun, such as a 10 gauge gun, 50 caliber gun, or other high energy projectile firing sources, is a useful source of energy for introducing seismic waves in the earth, a particular problem is that of most effectively coupling the energy from the projectile to the earth. The present invention is directed towards a means of providing a portable seismic energy source which more effectively utilizes the energy of a projectile in a way so that a greater portion of the energy is coupled to the earth to thereby produce a stronger and more effective seismic energy signal.

It is well known that when pressure is applied to a liquid medium contained within a vessel that the pressure is applied with equal force to all areas of the walls of the vessel. The present invention takes advantage of this phenomena. The impact of a projectile fired from a gun into a liquid xedium is coupled from the vessel containing the liquid medium, to the earth.

For this purpose a baseplate is provided having a lower surface adapted for contacting the earth. Extending from the baseplate upwardly therefrom is a master cylinder. Positioned within the master cylinder is a receiving cylinder of outside diameter less than the internal diameter of the master cylinder. The receiving cylinder is supported coaxially within the upper portion of the master cylinder. The master cylinder is filled with water to a height which encompasses at least a substantial portion of the receiving cylinder and preferably to a height of about the level of the upper end of the receiving cylinder.

Mounted on the master cylinder is a projectile firing gun pointed downwardly so that the muzzle of the gun is in coaxial alignment with the receiving cylinder and the lower end of the muzzle is above the liquid in the receiving and master cylinders.

The blast gas which is discharged from the muzzle of the gun when a projectile is fired must be vented and in a manner so as to minimize the effect thereof for the improved safety of the personnel operating the seismic energy source. Further, the energy source must be constructed in a manner that it is not quickly destroyed by the force of the impact of the projectile and the blast gas.

The object of the invention is to harness in a safe, non-destructive, economical, efficient and effective manner the enorxous hydraulic force obtainable by firing a high velocity projectile into a water-filled cylinder. Numerous air guns, water guns, weight drops and explosive devices take advantage of simple hydraulic action whereby the force applied to the top of a water column is transmitted to each equal unit surface area of the column wall and bottom, thus raising the level of force applied in contact with the earth as a seismic energy source.

A better understanding of the invention will be had by reference to the following description and claims, taken in conjunction with the attached drawing.

DETAILED DESCRIPTION OF THE PREFERRED EMBODIMENTS

Figure 1:
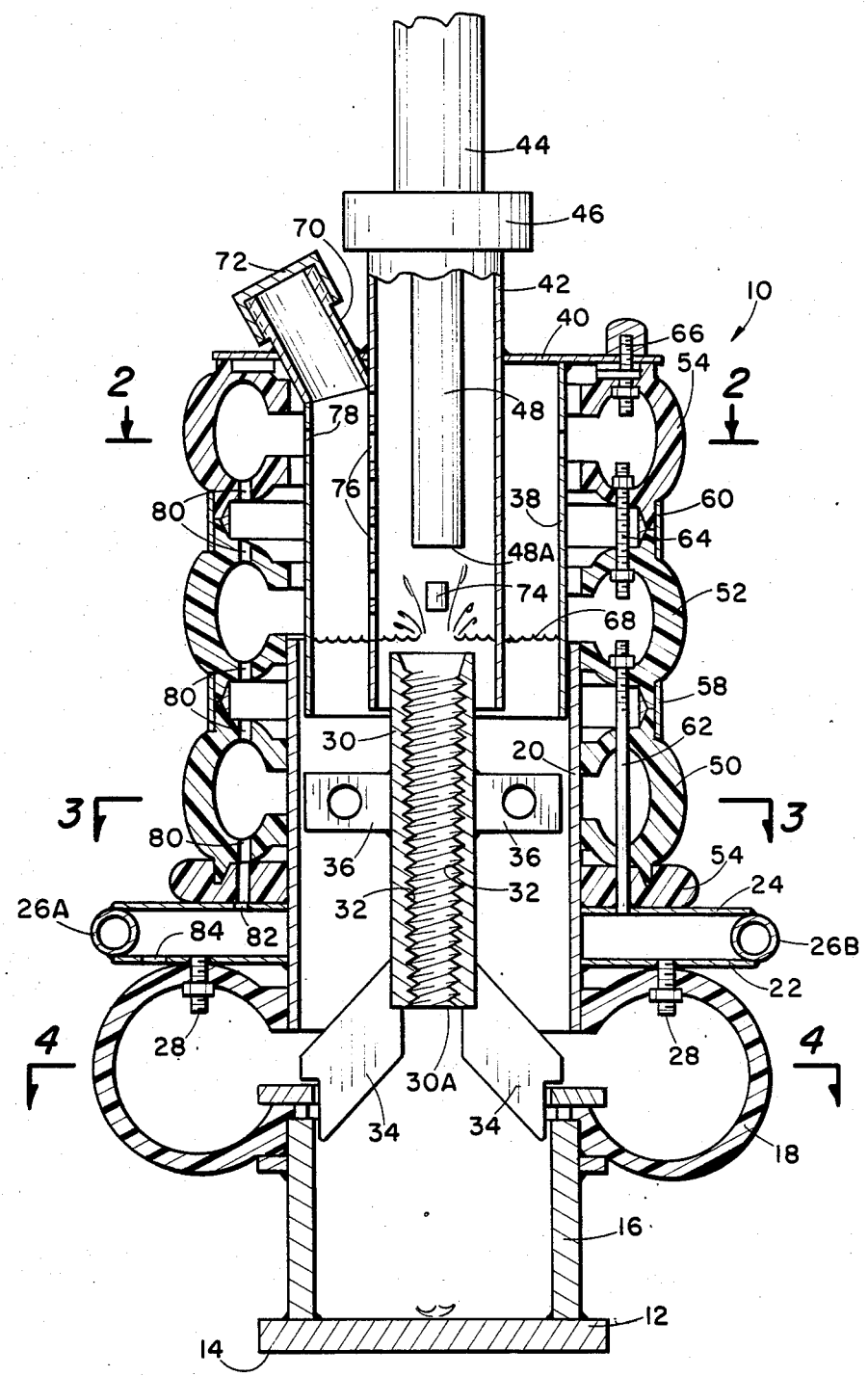
FIG. 1 is an elevational cross-sectional view of a portable source for generating seismic energy employing the principles of this invention.
Figure 3:
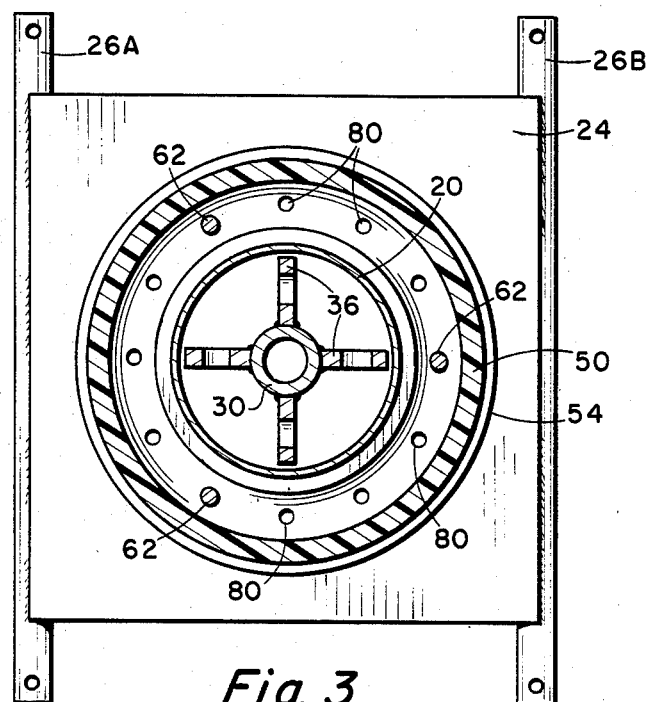
FIG. 3 is a cross-sectional view taken along the line 3—3 of FIG. 1 showing the intermediate portion of the seismic energy generating source and showing the area containing the receiving cylinder.
Figure 2:
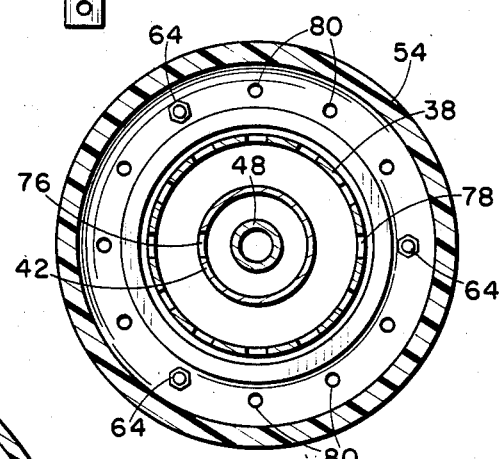
FIG. 2 is a cross-sectional view taken along the line 2—2 of FIG. 1 showing the cross-sectional arrangement of the upper portion of the seismic energy generator.
Figure 4:
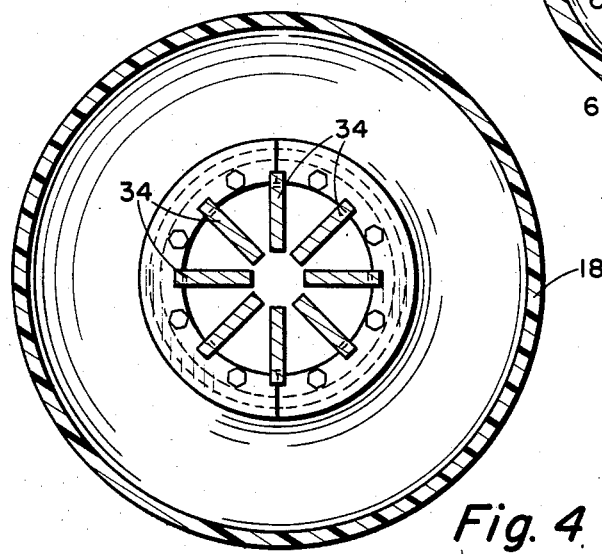
FIG. 4 is a cross-sectional view taken along the line 4—4 of FIG. 1 showing more details of the means whereby the receiving cylinder is supported within the base cylinder.

Referring to the various figures of the drawing the portable energy source is indicated generally by the numeral 10. The portable energy source 10 includes a baseplate 12 having a bottom surface 14 adapted to engage the earth. A cylindrical based cylinder 16 extends upwardly from the top of baseplate 12.

Affixed to the top of the base cylinder 16 is one rim of a pneumatic tire 18. The other rim of tire 18 engages the lower end of a master cylinder 20 which extends upwardly and coaxially with the base cylinder 16.

Affixed to the exterior of the master cylinder 20 are metal plates 22 and 24. Received between the metal plates are tubular members 26A and 26B.

The upper rim of tire 18 engages the external lower surface of master cylinder 20 in sealed engagement and the tire 20 is supported by bolts 28 to plate 22.

Positioned within master cylinder 20 is a receiving cylinder 30 having an external diameter less than the internal diameter of the master cylinder. The internal diameter of the receiving cylinder is such as to permit a slug, when deformed, to pass downwardly therethrough. The interior design of the receiving cylinder 30 is important. It has a spiral, serrated (threaded) interior 32 of converging diameter, that is, the internal diameter is less at the bottom end 30 than at the top. The importance of this arrangement will be discussed in more detail subsequently.

Affixed to the lower end of the receiving cylinder 30 are spaced apart radially extending flanges 34 which engage and are secured to the upper end of the base cylinder 16. To retain the receiving cylinder 30 centralized within the master cylinder 20 radial spacers 36 are affixed to its exterior surface.

Telescopically received within the upper end of the master cylinder 20 is an upper cylinder 38. A plate 40 closes the upper end of the upper cylinder and supports a gun mount tube 42. A gun 44 is secured to the gun mount tube 44 such as by a flange 46. While the element 44 is referred to as a gun this includes any projectile firing device which has a downwardly extending muzzle 48. The lower end 48A of the muzzle is above the upper end of the receiving cylinder 30.

Three chambers 50, 52 and 54 are positioned between plate 24 and upper plate 40, as well as an elastomeric pad 56. The chambers are held in place by rims 58 and 60. Spaced apart bolts 62, 64 and 66 retain the chambers alignment and retain the assembly together against the forces of the blast when a projectile is fired.

The chamber 50, 52 and 54 may be formed, as illustrated, of aircraft tires and rims. These chambers serve as accoustical sound barriers to diminish gun blast noise, as a safety barrier surrounding the reservoir, the cylinders and the gun barrel and muzzle so that in case of rupture of any of these components fragments will be intercepted and as space to vent muzzle blast gases and water splash to the ground.

The interior of the base cylinder 16 and master cylinder 20 are filled with water to an upper water level 68. The water level 68 preferably is slightly above the upper end of the receiving cylinder 30, however, the water level may be slightly below the upper end without substantial effect. To provide means to add water as necessary, a tube 70 closed by a cap 72 extends through plate 40 and into the interior of the upper cylinder 38.

With the base plate 12 positioned in firm contact with the earth's surface, a projectile 74 is fired from gun 44 passing out the end of muzzle 48. The projectile contacts the water surface 68 adjacent the top end of the receiving cylinder 30. Upon contact with the water the projectile tends to pancake, that is, flatten and this is particularly true if the projectile is made of lead, the preferred material since lead has a very high density. The serrated or spiral interior surface 32 of the receiving cylinder 30 causes a highly impeded flow arrest and deceleration of the slug 74 and of the water plug which tends to be driven downwardly by the slug. The incomplete and momentary flow stoppages results in the source of the slug-driven water plug being substantially transferred from the receiving cylinder to the base cylinder and thereby to the base plate 12 generating a high energy signal. Further, the pounds per square inch of force of water pressure generated within the receiving cylinder 30 by the impact of the slug 74 is transmitted directly to the baseplate 12 so that the force of impact of the projectile is transmitted to the baseplate both mechanically and hydraulically.

The slug rapidly decelerates within the receiving cylinder 30, giving up its energy to the cylinder and the hydraulic forces within the transporter and falls downwardly into the base cylinder 16.

The blast gases discharged from the muzzle 48 passes through holes 76 formed in the side wall of gun mount tube 72 and pass out through holes 78 formed in the upper cylinder 38. These gases pass through holes 80 formed at spaced intervals in tires 50, 52 and 54 and in pad 56 and through aligned holes 82 in upper plate 24, and then through spaced apart holes 84 in the lower plate. Thus, the blast gas is effectively dampened and discharged to the atmosphere.

Some of the advantages of the portable seismic source herein described are as follows: First, safety is insured since the slug, which acts as a piston in the water, is maintained inside the master cylinder. Second, high energy transfers is obtained. For example, an 8 gauge industrial magnum shell with a 3 ounce slug has a typical muzzle velocity of about 1744 feet per second and a muzzle energy of about 8,863 foot pounds. This energy is effectively coupled directly into the earth. Third, the cost of generating a seismic signal utilizing the invention is inexpensive. The costs of an 8 gauge shell, at the time of preparation of this disclosure, is less than $1.00. Fourth, the entire device is light weight. Typically, the assembly, with a gun will not exceed approximately 462 pounds. Fifth, industrial gun and shells are classified as industrial tools and need no special permits, such as is required with explosives.

While the invention has been described in which water fills the cylinders, many other liquids can be employed. The use of gel, that is, a thickened liquid, will further impede liquid flow for increased efficiency of energy transfer to the master cylinder.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A transportable seismic energy source employing a projectile functioning as a piston, comprising:
   a base plate having a lower surface adapted for contacting the earth's surface;
   a master cylinder affixed at its lower end to said base plate and extending uprightly therefrom;
   a receiving cylinder of outside diameter less than the internal diameter of said master cylinder and supported coaxially within the upper portion of said master cylinder, the master cylinder and receiving cylinder being filled with liquid;
   a slug firing gun mounted to said master cylinder, the gun having a muzzle extending coaxially and above said receiving cylinder, the lower end of the muzzle being above the liquid level in said master and said receiving cylinder, the internal diameter of said receiving cylinder being greater than the maximum diameter of a slug as distorted upon impact with liquid in said receiving cylinder whereby a slug will pass downwardly through the interior of said receiving cylinder and enter said master cylinder; and
   means to vent blast gas from said gun muzzle to the exterior of said master cylinder.

2. The seismic energy source according to claim 1 wherein said receiving cylinder is internally tapered towards reduced internal diameter at its lower end.

3. The seismic energy source according to claim 1 wherein said receiving cylinder has an internal surface defined, at least in part, by circumferential grooves.

4. The seismic energy source according to claim 1 including:
   an upright tubular sleeve of diameter different from said master cylinder, the lower end thereof being telescopically positioned relative to the upper end of said master cylinder, the sleeve being coaxial with said master cylinder, said gun being supported to the upper end of said sleeve and said gun muzzle being coaxially received in said sleeve; and
   means to resiliently support said sleeve to said master cylinder to permit limited telescopic movement therebetween.

5. The seismic energy source according to claim 4 wherein said means to resiliently support said sleeve to said master cylinder includes a plurality of pneumatic tires enveloping said master cylinder and said sleeve, the tires being vertically stacked and secured to each other, the lowermost tire being secured to said master cylinder and the uppermost tire being secured to said sleeve.

* * * * *